June 10, 1924.
P. L. ALGER
INDUCTION MOTOR
Filed Jan. 21. 1921
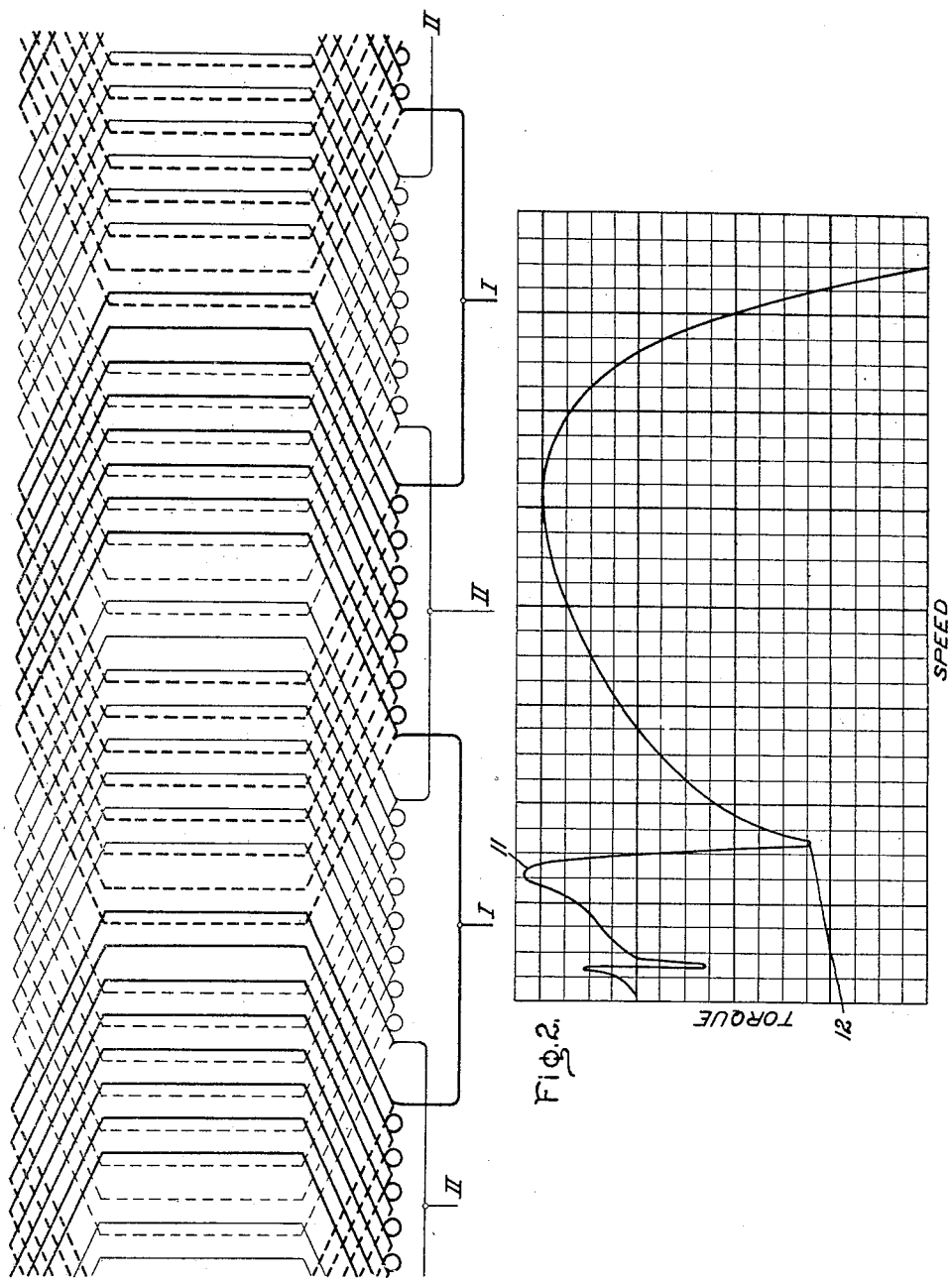
Inventor:
Philip L. Alger,
by Albert G. Davis
His Attorney.

Patented June 10, 1924.

1,497,312

UNITED STATES PATENT OFFICE.

PHILIP L. ALGER, OF SCHENECTADY, NEW YORK, ASSIGNOR TO GENERAL ELECTRIC COMPANY, A CORPORATION OF NEW YORK.

INDUCTION MOTOR.

Application filed January 21, 1921. Serial No. 438,886.

*To all whom it may concern:*

Be it known that I, PHILIP L. ALGER, a citizen of the United States, residing at Schenectady, in the county of Schenectady, State of New York, have invented certain new and useful Improvements in Induction Motors, of which the following is a specification.

This invention relates to induction motors, and more particularly to high speed polyphase induction motors.

When induction motors are for example operated from a two-phase source, and when they have a comparatively small number of poles so that they operate at a high speed, there is usually a tendency for the motor to stick at some speed considerably below synchronism. These speeds are usually termed subsynchronous speeds, and are due for the most part to harmonics produced by the arrangement of the primary windings of the motor. These harmonics are present in all machines, but are especially pronounced in high speed two-phase machines. Ordinarily such tendencies to subsynchronous speed are reduced by making the armature coils of the machine of fractional pitch, but in certain cases such an expedient is not practical, and in those cases subsynchronous speeds have been found to be very troublesome. It is the main object of my invention to reduce the tendency to operate at subsynchronous speeds by an appreciable amount by the aid of a simple expedient alternative to or in addition to the use of fractional pitch winding.

For a better understanding of my invention, reference is to be had to the following specification in connection with the accompanying drawings, in which Fig. 1 is a developed armature winding of a high speed two-phase motor embodying my invention, and Fig. 2 is a speed torque curve of an induction motor in which there is a tendency to operate at subsynchronous speeds.

Attention is called to the shape of the torque curve in Fig. 2 which shows that at point 11 only slightly removed from standstill a very high torque is obtained which later drops rapidly to a low value at 12 from which point to synchronism the torque curve assumes the ordinary normal shape. With the aid of my invention this peak in the torque curve is reduced sufficiently so that there is absolutely no danger of the motor sticking at the speed corresponding to this peak. The essence of my invention resides in so distributing the winding in each phase belt of the primary that fewer conductors are present in its outer edges than would be the case if the total number of conductors were evenly distributed over the entire periphery. One scheme for doing this consists in distributing each phase belt of the primary over an angle slightly less than the angle which it would occupy were all of the windings evenly distributed. It has been found that even a slight reduction in the angle occupied by the windings is sufficient to reduce to a great extent the subsynchronous torque peaks. Especially is this most effective when the windings of the motor are made of fractional pitch so that the beneficial results of both schemes are accumulated.

One example of the kind of primary or armature winding which I have used is that illustrated in Fig. 1 for two-phase two-pole motors. In this case the windings shown in heavy lines constitute one phase and the windings shown in light lines constitute the other phase. There are in this particular instance 36 slots. The windings in the phase shown in heavy lines which I designate as phase I are divided into two parallel sections, and I have shown each of these sections distributed over eight slots which is one slot less than the winding would occupy were it distributed over an angle that would make the winding evenly distributed around the entire periphery. Each section is made up of fractional pitch coils, but so connected as to give a bipolar arrangement, as is easily verified. The same remarks hold as regards the two sections of phase II which comprises the winding shown in light lines.

It is of course understood that any form of co-operating secondary winding may be utilized to render the motor complete, and since such windings are well known it is not considered essential to describe them in further detail.

I have shown in the foregoing example but one embodiment of my invention. It is to be understood, however, that other forms of winding may be utilized so long as there is produced the effect of a slight narrowing of the phase belt, and I aim to embrace in the appended claims all modifications falling fairly within the scope of my invention.

What I claim as new and desire to secure by Letters Patent of the United States, is:

1. In a high speed polyphase induction motor having members for accommodating windings, a plurality of distributed primary windings arranged in evenly distributed phase belts, each of said phase belts being distributed over an angle less than that which would be required for all the phase belts to fill the entire periphery of the member accommodating the primary windings.

2. In a high speed polyphase induction motor having members for accommodating windings, a plurality of distributed primary windings arranged in phase belts, each of said phase belts being arranged with fewer conductors in its outer edges than would be the case were the total number of conductors of all the phases evenly distributed over the entire periphery.

3. In a polyphase induction motor a distributed primary winding arrangement for reducing the tendency of the motor to operate at a sub-synchronous speed, consisting in separating all the phase belts of the primary winding by a distance greater than the distance between adjacent primary winding slots.

In witness whereof, I have hereunto set my hand this 19th day of January, 1921.

PHILIP L. ALGER.